(12) United States Patent
Xu et al.

(10) Patent No.: US 8,718,213 B2
(45) Date of Patent: May 6, 2014

(54) CLOCK SYNCHRONIZATION METHOD, APPARATUS, AND SYSTEM

(71) Applicant: Huawei Technologies Co., Ltd., Guangdong (CN)

(72) Inventors: Guijin Xu, Shenzhen (CN); Guozhu Long, Santa Clara, CA (US); Ruzhou Feng, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/625,833

(22) Filed: Sep. 24, 2012

(65) Prior Publication Data

US 2013/0308712 A1 Nov. 21, 2013

Related U.S. Application Data

(63) Continuation of application No. PCT/CN2011/072106, filed on Mar. 24, 2011.

(30) Foreign Application Priority Data

Mar. 24, 2010 (CN) .......................... 2010 1 0132646

(51) Int. Cl.
 *H04L 7/00* (2006.01)
(52) U.S. Cl.
 USPC ......................................................... 375/356
(58) Field of Classification Search
 USPC .................. 375/354, 356, 371; 370/503, 516
 See application file for complete search history.

(56) References Cited

U.S. PATENT DOCUMENTS

| 6,804,318 | B1 * | 10/2004 | Alloin et al. | 375/373 |
| 6,937,613 | B1 | 8/2005 | Bedrosian | |
| 7,660,332 | B2 * | 2/2010 | Quijano | 370/516 |
| 7,864,747 | B2 * | 1/2011 | Wolfe et al. | 370/350 |

(Continued)

FOREIGN PATENT DOCUMENTS

| CN | 1444365 A | 9/2003 |
| CN | 1522510 A | 8/2004 |

(Continued)

OTHER PUBLICATIONS

Search report issued in corresponding PCT application No. PCT/CN2011/072106, dated Jun. 30, 2011, 3 pages total.

(Continued)

*Primary Examiner* — Khanh C Tran
(74) *Attorney, Agent, or Firm* — Leydig, Voit & Mayer, Ltd.

(57) ABSTRACT

A clock synchronization method, apparatus, and system are provided according to the embodiments of the present invention. The method includes: receiving time information TM1 from a central office side, in which the time information TM1 is obtained by the central office side by reading a local clock of the central office side when transmission data at a first designated location starts to be transferred, and the local clock of the central office side is synchronous with a Global Positioning System (GPS) clock or a Building Integrated Timing Supply (BITS) clock; determining whether transmission data at a second designated location starts to be received, if so, reading a local clock of the Customer Premises Equipment side to obtain time information TS1; and synchronizing a clock frequency of the Customer Premises Equipment side to the central office side according to the time information TM1 and the time information TS1.

13 Claims, 8 Drawing Sheets

(56) References Cited

U.S. PATENT DOCUMENTS

| | | |
|---|---|---|
| 2003/0169776 A1 | 9/2003 | Reesor |
| 2009/0059962 A1 | 3/2009 | Schmidt et al. |
| 2011/0296226 A1* | 12/2011 | Sorbara et al. ............... 713/400 |
| 2012/0020417 A1* | 1/2012 | Wei et al. ..................... 375/259 |

FOREIGN PATENT DOCUMENTS

| | | |
|---|---|---|
| CN | 1866814 A | 11/2006 |
| EP | 1417793 B1 | 5/2004 |
| WO | 2009029339 A1 | 3/2009 |

OTHER PUBLICATIONS

IEEE Std 1588™-2008: "IEEE Standard for a Precision Clock Synchronization Protocol for Networked Measurement and Control Systems", dated Jul. 24, 2008, 289 pages total.

Written opinion issued in corresponding PCT application No. PCT/CN2011/072106, Jun. 30, 2011, total 4 pages.

Search report issued in corresponding EP application No. 11758809.5, Dec. 13, 2012, total 6 pages.

Office action issued in corresponding to Chinese application No. 201010132646.7, dated Feb. 4, 2013, and an English translation thereof, total 8 pages.

* cited by examiner

_US 8,718,213 B2_

CLOCK SYNCHRONIZATION METHOD, APPARATUS, AND SYSTEM

CROSS-REFERENCE TO RELATED APPLICATIONS

This application is a continuation of International Application No. PCT/CN2011/072106, filed on Mar. 24, 2011, which claims priority to Chinese Patent Application No. 201010132646.7, filed on Mar. 24, 2010, both of which are incorporated herein by reference in their entireties.

FIELD OF THE INVENTION

The present invention relates to the field of communications, and in particular, to a clock synchronization method, apparatus, and system.

BACKGROUND OF THE INVENTION

Nowadays, as digital mobile technology develops rapidly, femtocells are already being introduced into homes. A femtocell based on a Digital Subscriber Line (DSL) system is greatly in need of a low-cost and accurate clock synchronization solution.

Typical DSL systems have a clock synchronization method which directly depends upon a network reference clock. The method is described as follows. It is assumed that a working clock of a transmission (TX) unit on a central office (CO) side is C1 and C1 is directly obtained through frequency multiplication or phase-locked frequency multiplication of the network reference clock CLK2, the working clock C1 is transferred to a Customer Premises Equipment (CPE) side through a physical signal. C1' is a working clock restored by the CPE side from the physical signal. C1' is a mirror of C1. Therefore, C1' is synchronous with C1. Moreover, C1 is further synchronous with the network reference clock CLK2, so C1' is further synchronous with the network reference clock CLK2. CLK2' is frequency-divided from C1'. The clock frequency synchronization between CLK2' and CLK2 may be achieved by matching factors of frequency multiplication on the CO side and the frequency division on the CPE side.

However, the working clock of DSL systems in the prior art is a network reference clock. The working reliability of the system depends upon the reliability of the network reference clock. If a failure occurs on the network reference clock, the normal operation of the whole DSL system is affected.

SUMMARY OF THE INVENTION

Embodiments of the present invention provide a clock synchronization method, apparatus, and system, so that the reliability of the clock synchronization in a DSL system can be independent from the reliability of a network reference clock.

In one aspect, an embodiment of the present invention provides a clock synchronization method. The method includes: receiving time information TM1 from a central office side, in which the time information TM1 is obtained by the central office side by reading a local clock of the central office side when transmission data at a first designated location starts to be transferred, and the local clock of the central office side is synchronous with a Global Positioning System (GPS) clock or a Building Integrated Timing Supply (BITS) clock; determining whether transmission data at a second designated location starts to be received, if so, reading a local clock of a Customer Premises Equipment side to obtain time information TS1; and synchronizing a clock frequency of the Customer Premises Equipment side to the central office side according to the time information TM1 and the time information TS1.

In another aspect, an embodiment of the present invention provides a Customer Premises Equipment apparatus which includes: a receiving unit configured to receive time information TM1 from a central office side, in which the time information TM1 is obtained by the central office side by reading a local clock of the central office side when transmission data at a first designated location starts to be transferred, and the local clock of the central office side is synchronous with a GPS clock or a BITS clock; a judgment unit configured to determine whether transmission data at a second designated location starts to be received; a reading unit configured to read a local clock of the Customer Premises Equipment side to obtain time information TS1 when the transmission data at the second designated location starts to be received; and a synchronization unit configured to synchronize a clock frequency of the Customer Premises Equipment side to the central office side according to the time information TM1 and the time information TS1.

In another aspect, an embodiment of the present invention provides a clock synchronization system, which includes: a central office comprising a reading unit configured to read a local clock of the central office side to obtain a time information TM1 when transmission data at a first designated location starts to be transferred, wherein the local clock of the central office side is synchronous with a GPS clock or a BITS clock; and a transmission unit configured to transmit the time information TM1; and the Customer Premises Equipment as described above.

In at least some embodiments of the present invention, a network reference clock is not used as a working clock to perform the clock synchronization of a DSL system, and therefore the reliability of a DSL link may be independent from the reliability of the network reference clock.

DETAILED DESCRIPTION OF THE EMBODIMENTS

Figure 1:
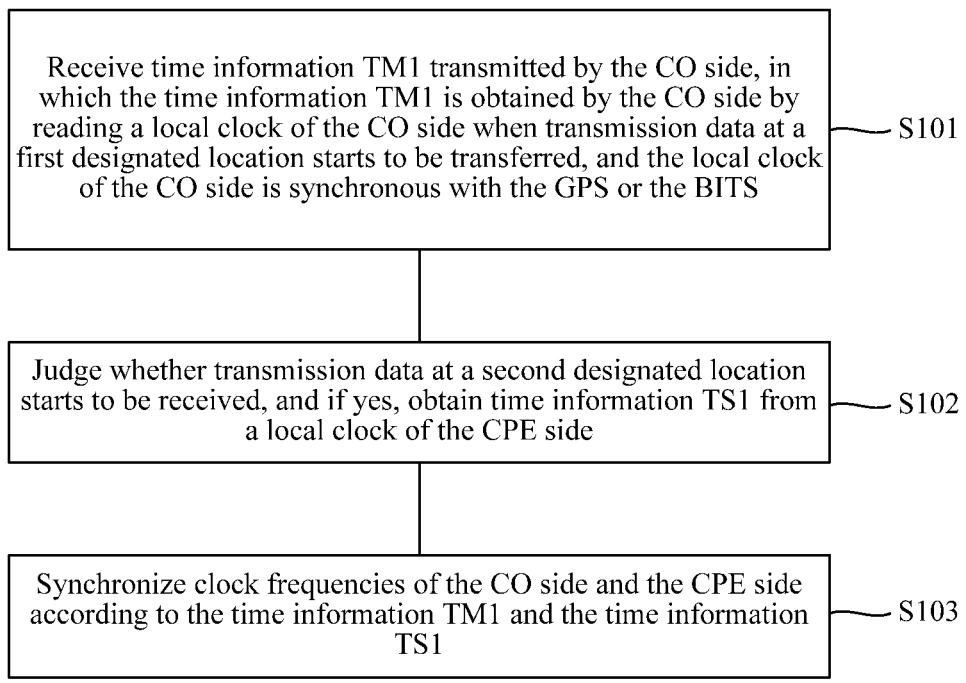
FIG. 1 is a schematic flow chart of a clock synchronization method according to an embodiment of the present invention.

FIG. 1 is a schematic flow chart of a clock synchronization method according to an embodiment of the present invention. It should be noted that, the embodiment of the present invention provides a clock synchronization method for a CO side and a CPE side in a DSL system, and the embodiment of the present invention is described based on the CPE side. The method includes the following steps.

S101: Receive time information TM1 transmitted by the CO side, in which the time information TM1 is obtained by the CO side by reading a local clock of the CO side when transmission data at a first designated location starts to be transferred, and the local clock of the CO side is synchronous with the GPS or the BITS.

The transmission data has two forms, a digital signal and an analog signal on both the CO side and the CPE side. For example, the CPE side may convert an analog signal transmitted from an analog communication line into a digital signal, or convert a digital signal into an analog signal and the signal is transmitted to the CO side. In the DSL, a symbol is used as a unit when an analog signal is transmitted on the analog communication line. Symbols are transmitted continuously and a cyclic prefix may be added between the symbols to eliminate the interference between the symbols. Determining a designated location of the transmission data in the embodiment of the present invention may also relate to the two types of signals. It should be noted that, in this embodiment, which type of signals is used as a basis for determining the designated location of the transmission data is not limited.

S102: Judge whether transmission data at a second designated location starts to be received, and if yes, obtain time information TS1 from a local clock of the CPE side.

The CPE side may monitor the received transmission data in an analog form or a digital form, judges whether the transmission data at the designated location starts to be received. Here, the designated location of the transmission data is the same as the designated location of transmission data of the CO side. If it is found that the transmission data at the designated location already starts to be received, the time information TS1 from the local clock of the CPE side is read.

103: Synchronize clock frequencies of the CO side and the CPE side according to the time information TM1 and the time information TS1.

Since an offset may exist between frequencies of counting frequency signals of the local clocks of the CO side and the CPE side, namely, the clock of the CO side and the clock of the CPE side are asynchronous, the clock frequencies of the CO side and the CPE side are required to be synchronized according to the time information TM1 and the time information TS1.

Specifically, the CPE side may adjust the clock frequency of the local clock of the CPE side according to change information of a difference between the time information TM1 and the time information TS1 till the clock frequency is equal to the network reference clock frequency of the CO side. In practical implementation, the CPE side may use the time information TM1 and the time information TS1 through a phase-locked loop to synchronize the clock frequencies of the CO side and the CPE side.

It should be noted that, the first designated location of the transmission data on the CO side and the second designated location of the transmission data on the CPE side may be the same location and may also be different locations.

In the embodiment of the present invention, a network reference clock is not used as a working clock to perform the clock synchronization of a DSL system, and therefore the reliability of a DSL link may be independent from the reliability of the network reference clock. In addition, in the embodiment of the present invention, the time information TM1 and the time information Ts1 may be read at any location of the transmission data in the DSL system, regardless of whether the transmission data exists in a digital form or in an analog form.

Figure 2:
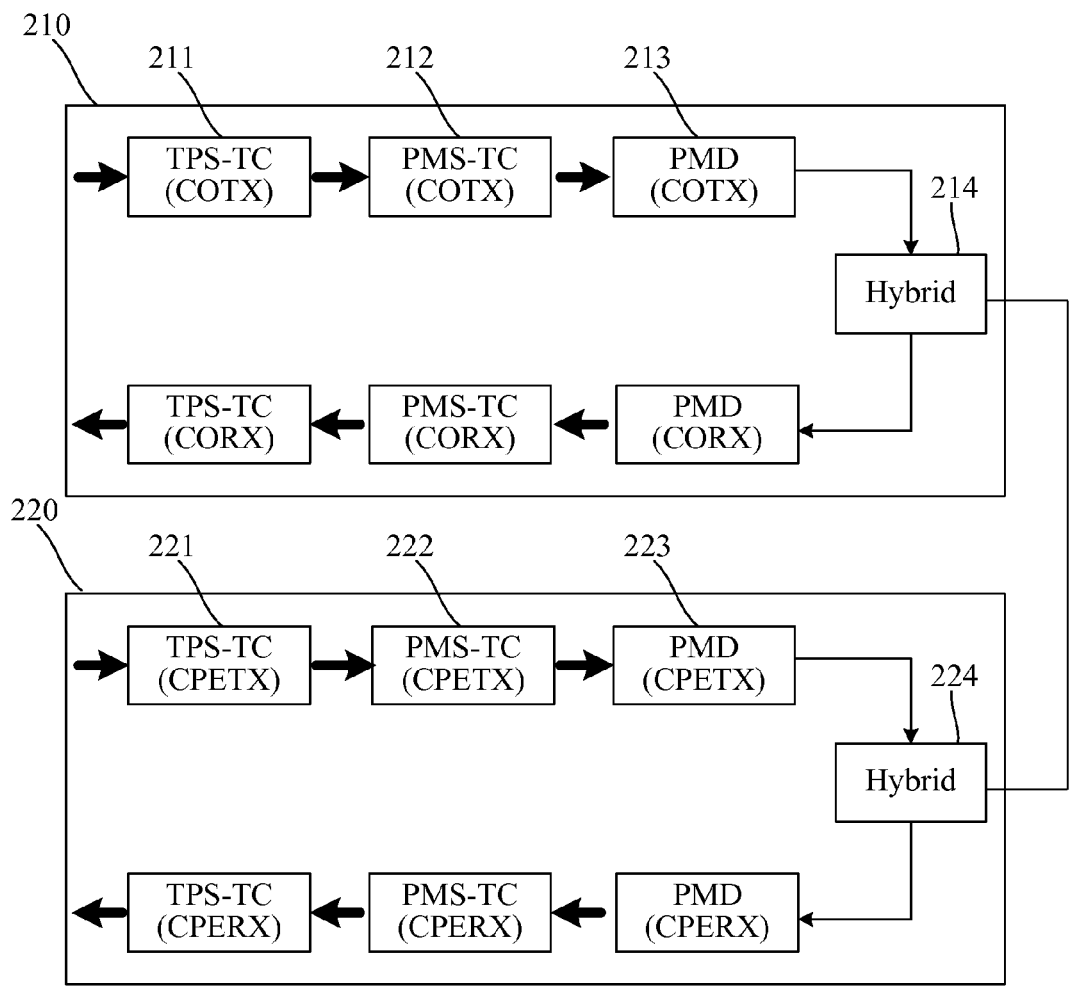
FIG. 2 is a schematic structural diagram of a DSL system in the prior art.

FIG. 2 is a schematic structural diagram of a DSL system in the prior art. The system includes a central office 210 and a Customer Premises Equipment 220. The central office 210 and the Customer Premises Equipment 220 are connected to each other through a twisted pair cable. Moreover, the central office 210 includes a two-to-four wire conversion circuit (Hybrid) 214 and a Transmission Protocol-Specific TC Layer (Transmission Protocol-Specific TC Layer, TPS-TC) unit 211, a Physical Media-Specific TC Layer (Physical Media-Specific TC Layer, PMS-TC) unit 212 and a Physical Media Dependent (Physical Media Dependent, PMD) unit 213 serving as a transmission terminal. The Customer Premises Equipment 220 includes a Hybrid 224 and a TPS-TC unit 221, a PMS-TC unit 222 and a PMD unit 223 serving as a receiving terminal Definitely, the central office 210 may further include the three units serving as a receiving terminal, and the Customer Premises Equipment 220 may further include the three units serving as a transmission terminal. Since transmission and receiving are reciprocal processes, only one scenario is to be discussed here.

In the TPS-TC unit and the PMS-TC unit, transmission data exists in a digital form, and the minimum unit of the data is a bit. Moreover, in the PMD unit, the PMD unit has modulation and demodulation functions and is capable of converting transmission data in a digital form into transmission data in an analog form and transmitting the data to the twisted pair cable through the Hybrid, or converting transmission data in an analog form on the twisted pair cable into transmission data in a digital form and transmitting the data to the PMS-TC unit.

Figure 3:
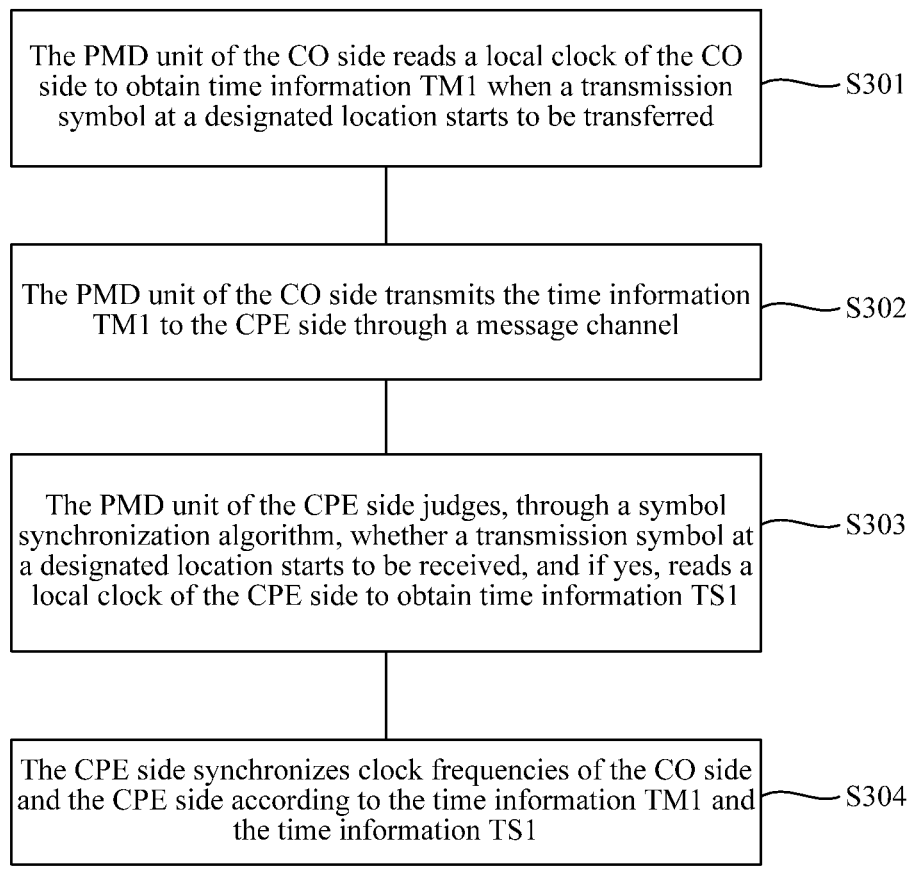
FIG. 3 is a schematic flow chart of another clock synchronization method according to an embodiment of the present invention.

The DSL system shown in FIG. 2 is used as a basis for further description of the embodiments of the present invention in the following. FIG. 3 is a schematic flow chart of another clock synchronization method according to an embodiment of the present invention. The clock synchronization method described by the embodiment of the present invention is implemented by the central office and the PMD unit in the Customer Premises Equipment in FIG. 2. The method includes the following steps.

S301: The PMD unit of a CO side reads a local clock of the CO side to obtain time information TM1 when a transmission symbol at a first designated location starts to be transferred.

In this embodiment, the first designated location of the transmission symbol may be designated randomly, such as at a start location or an end location of the transmission symbol, or any location between the start location and the end location of the transmission symbol. After the designated location is determined, when the transmission symbol at the designated location starts to be transferred, the PMD unit of the CO side may generate a trigger signal, so that the PMD unit may obtain time information TM1 from the local clock of the CO side according to the trigger signal. Since the local clock of the CO side is synchronous with the GPS or the BITS, the time information TM1 is also synchronous with the GPS or the BITS.

S302: The PMD unit of the CO side transmits the time information TM1 to a CPE side through a message channel. After the PMD unit of the CO side obtains the time information TM1, may first store the time information TM1 locally, and then transmit the time information TM1 to the CPE side through the message channel between the CO side and the CPE side.

S303: The PMD unit of the CPE side judges, through a symbol synchronization algorithm, whether a transmission symbol at a second designated location starts to be received, and if yes, reads a local clock of the CPE side to obtain time information TS1.

The symbol synchronization algorithm mentioned here is a common algorithm in the prior art, which is mainly used to determine a start location of receiving a symbol. When the start location is determined, any location in the symbol can be determined accordingly.

If it is judged through the symbol synchronization algorithm that the transmission symbol at the second designated location already starts to be received, the PMD unit of the CPE side may further generate a trigger signal, so that the PMD unit may read the local clock of the CPE side according to the trigger signal to obtain time information TS1.

S304: The CPE side synchronizes clock frequencies of the CO side and the CPE side according to the time information TM1 and the time information TS1. It can be seen from the foregoing description that, the time information TM1 is the time when the transmission symbol at the first designated location is transmitted at the CO side, and the time information TS1 is the time when the transmission symbol at the second designated location is received by the CPE side. For every certain period, the CPE side may receive a group of TM1 and TS1, and therefore the CPE side may adjust the clock frequency of the CPE side according to change information of a series of differences between TM1 and TS1 till the clock frequency of the CPE side is synchronous with the clock frequency of the CO side.

It should be noted that, the first designated location and the second designated location may be the same location of the transmission symbol, and may also be different locations of the transmission symbol. In addition, the interval that the CO side reads the TM1 and the interval that the CPE side reads the TS1 may be the same, and may also be different. For example, the CO side may read the TM1 once at every three transmission symbols, and the CPE side may read the TS1 once at every three transmission symbols, or may also read the TS1 once at every five transmission symbols. However, when the intervals are different, the CO side needs to transmit its own interval information of reading the TM1 to the CPE side, so that the CPE side may synchronize the clock frequencies of the CO side and the CPE side according to the time information TM1 and the time information TS1.

Figure 4:
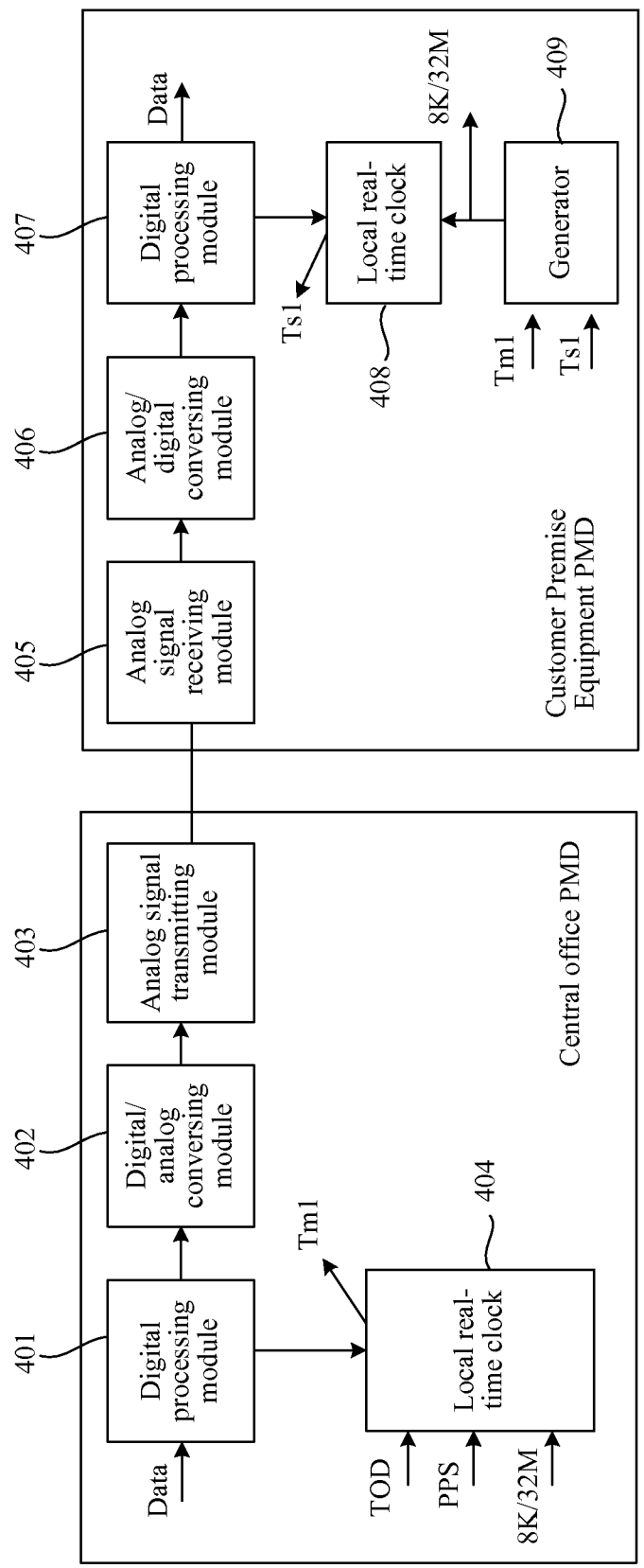
FIG. 4 is a schematic structural diagram of a system performing clock synchronization by using a PMD unit in a DSL system according to an embodiment of the present invention.

For better understanding of steps S301-S304, a specific example is taken for illustration in the following. FIG. 4 is a schematic structural diagram of a system performing clock synchronization by using a PMD unit in a DSL system according to an embodiment of the present invention.

In FIG. 4, a PMD unit of a central office includes a digital processing module 401, a digital/analog conversing module 402, an analog signal transmitting module 403, and a local real-time clock 404. A PMD unit of a Customer Premises Equipment includes an analog signal receiving module 405, an analog/digital conversing module 406, a digital processing module 407, a local real-time clock 408, and a generator 409.

On a CO side, the local real-time clock 404 may provide, according to a network reference time signal (Time Of Data, TOD), a network Pulse per Second (Pulse per Second, PPS) reference signal and a network frequency reference signal (8K/32M), a high-accuracy real-time time information for the CO side, in which the time information is synchronous with the GPS or the BITS. When the CO side has data to be transmitted to the CPE side, the data is converted from a digital signal into an analog signal that uses a symbol as a unit, after the data is processed by the digital processing module 401 and the digital/analog conversing module 402, and then the analog signal is transmitted by the analog signal transmitting module 403. When the data of the symbol at the first designated location is transmitted, for example, when the data at the start location is transmitted, the digital processing module 401 may transmits a trigger signal, read real-time time information TM1 from the local real-time clock 404 according to the trigger signal, store the TM1 locally, and then transmit the TM1 to a CPE side by using a message channel.

On a CPE side, a counting frequency signal of the local real-time clock 408 is Clk. Since the frequency of the Clk and the frequency of the network frequency reference signal (8K/32M) of the local real-time clock 404 of the CO side may be asynchronous, a time offset may exist between the local real-time clock 408 of the CPE side and the local real-time clock 404 of the CO side.

In this embodiment, the CPE side, in one aspect, stores the TM1 locally after obtaining the time information TM1, and in another aspect, indicates, through a symbol synchronization algorithm in the digital processing module 407, when the analog signal receiving module 405 is receiving the data of the symbol at the second designated location, and the second designated location may be an end location in this embodiment. When the data at the end location of the symbol starts to be received by the analog signal receiving module 405, the digital processing module 407 may transmit a trigger signal, read time information Ts1 from the local real-time clock 408 according to the trigger signal, and stores the Ts1 locally.

For every certain period, the CPE side may store a group of corresponding TM1 and Ts1. The generator 409 of the CPE side may synchronize the clock frequencies of the CO side and the CPE side according to a series of the TM1 and Ts1.

In the embodiment of the present invention, a network reference clock is not used as a working clock to perform the clock synchronization of a DSL system, and therefore the reliability of a DSL link may be independent from the reliability of the network reference clock. In addition, in the embodiment of the present invention, transmission data may exist in an analog form in the DSL system, and time information TM1 and time information Ts1 may be read at any location of the transmission data.

Figure 5:
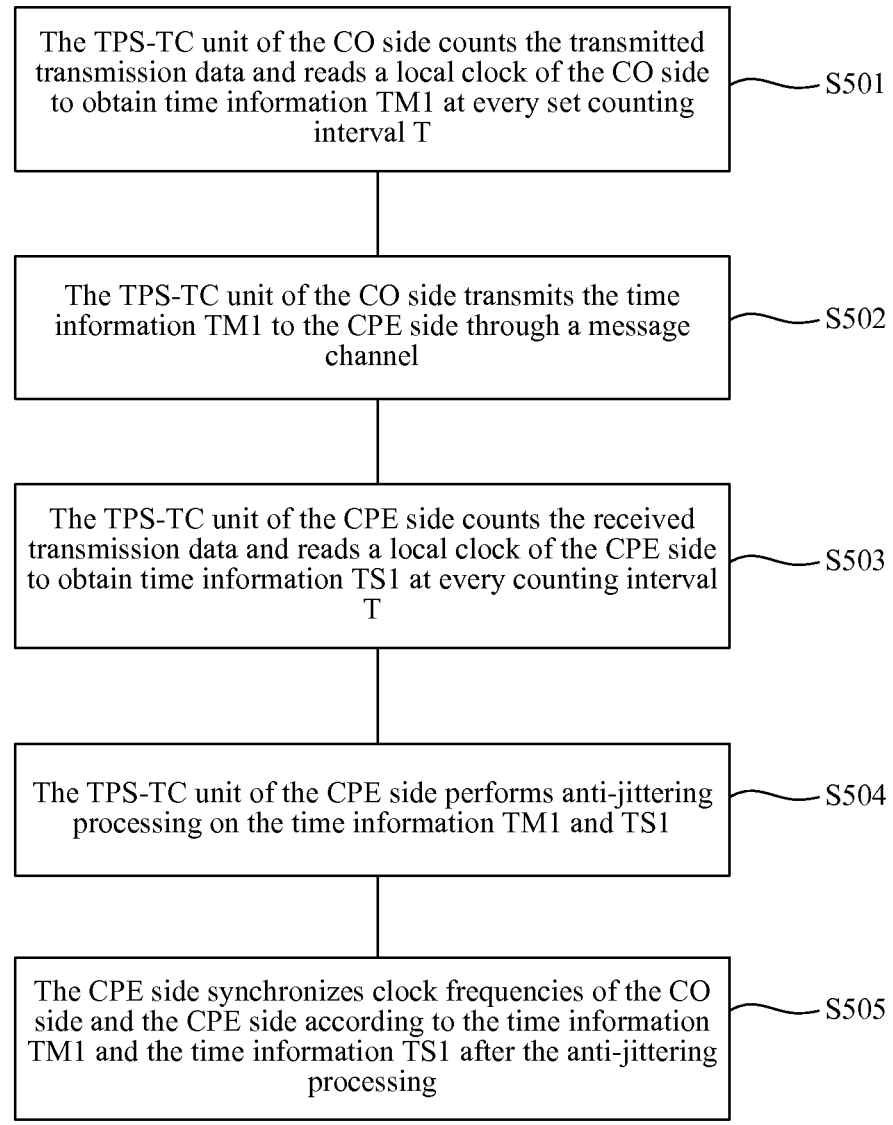
FIG. 5 is a schematic flow chart of another clock synchronization method according to an embodiment of the present invention.

FIG. 5 is a schematic flow chart of another clock synchronization method according to an embodiment of the present invention. The clock synchronization method described in the embodiment of the present invention is implemented through the central office and the TPS-TC unit or the PMS-TC unit of the Customer Premises Equipment in FIG. 2. The method includes the following steps.

S501: A TPS-TC unit of a CO side counts transmitted transmission data and reads a local clock of the CO side to obtain time information TM1 at every set counting interval T2.

Since the transmission data exists in a digital form in the TPS-TC unit, a counter may be set in the TPS-TC unit to count the transmission data. The counting may use a bit as a unit, or use a byte as a unit, and may also use a double-byte as a unit, which is not limited in this embodiment.

The counting interval T2 is an integer larger than 0, and the value of the interval may be set randomly. At a counting interval T of the counting value, the TPS-TC unit of the CO side may generate a trigger signal, so that the TPS-TC unit may read the local clock of the CO side according to the trigger signal to obtain time information TM1.

S502: The TPS-TC unit of the CO side transmits the time information TM1 to a CPE side through a message channel.

The step is similar to S302, so the step is not described again herein.

S503: The TPS-TC unit of the CPE side counts the received transmission data and reads a local clock of the CPE side to obtain time information Ts1 at every counting interval T1.

Figure 6:
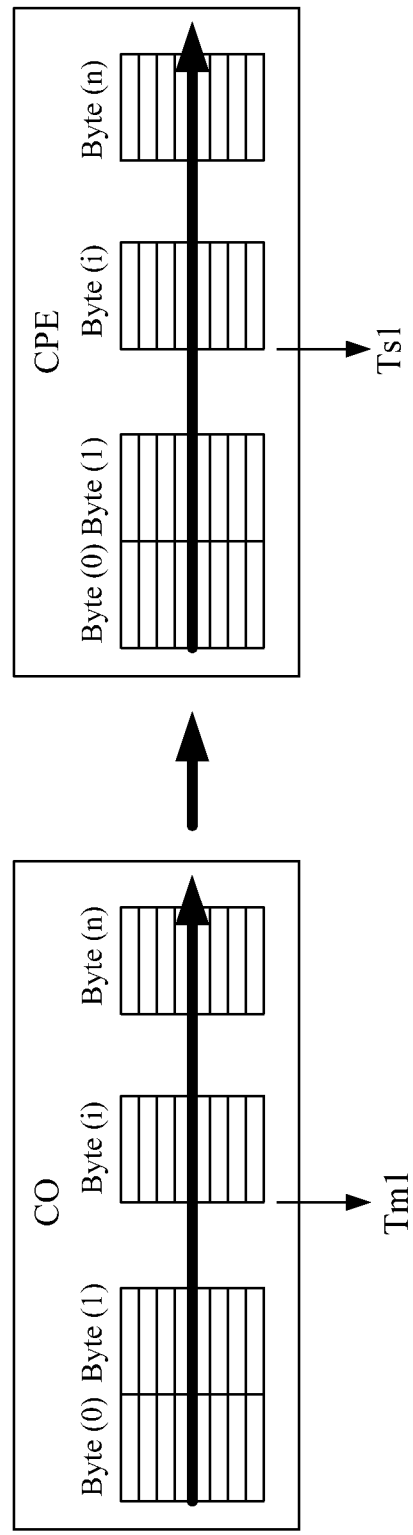
FIG. 6 is a schematic diagram of reading time information from a digital signal according to an embodiment of the present invention.

Through step S503, the time information TM1 corresponding to the first designated location of the transmission data and the time information Ts1 corresponding to the second designated location of the transmission data may be obtained. The first designated location and the second designated location of the transmission data may be altered by changing the counting intervals T2 and T1. Referring to FIG. 6, FIG. 6 is a schematic diagram of reading time information from a digital signal according to an embodiment of the present invention. In FIG. 6, the counting interval is i. When an $i^{th}$ byte is sent, the TPS-TC unit of the CO side obtains time information TM1, whereas on the CPE side, when the $i^{th}$ byte is received, the TPS-TC unit of the CPE side obtains time information Ts1.

It should be noted that, the counting intervals T1 and T2 may be the same, or may be different. When the counting intervals are different, the CO side needs to transmit the counting interval T1 to the CPE side.

S504: The TPS-TC unit of the CPE side performs anti jittering processing on the time information TM1 and the time information Ts1.

In this embodiment, the method of anti jittering processing may be determined according to a type of jittering. For example, when the jittering is random jittering, a smoothing filter may be used to perform the anti jittering processing on the time information TM1 and the time information Ts1.

As an embodiment of the present invention, the anti jittering processing of the time information TM1 and the anti jittering processing of the time information Ts1 may be completed on the CPE side at the same time, and may also be completed on the CO side and the CPE side, respectively. For example, the anti jittering processing of the time information TM1 is completed on the CO side and the anti jittering processing of the time information Ts1 is completed on the CPE side.

S505: The CPE side synchronizes clock frequencies of the CO side and the CPE side according to the time information TM1 and the time information TS1 after the anti jittering processing.

In the embodiment of the present invention, a network reference clock is not used as a working clock to perform clock synchronization of a DSL system, and therefore the reliability of a DSL link may be independent from the reliability of the network reference clock. In addition, in the embodiment of the present invention, transmission data may exist in a digital form in the DSL system, and time information TM1 and time information Ts1 may be read at any location of the transmission data. In addition, the embodiment of the present invention further eliminates the influence of network jittering during the clock synchronization when the transmission data exists in a digital form.

Figure 7:
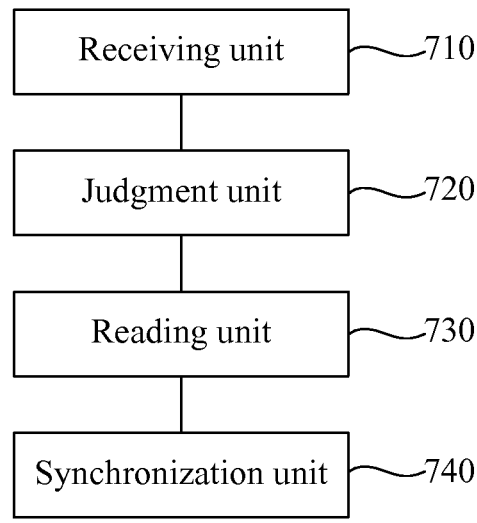
FIG. 7 is a schematic structural diagram of a clock synchronization apparatus according to an embodiment of the present invention.

FIG. 7 is a schematic structural diagram of a clock synchronization apparatus according to an embodiment of the present invention. The apparatus is located on a CPE side. The apparatus includes a receiving unit 710, a judgment unit 720, a reading unit 730, and a synchronization unit 740.

The receiving unit 710 is configured to receive time information TM1 transmitted by a central office side, in which the time information TM1 is obtained by a CO side by reading a local clock of the CO side when transmission data at a first designated location starts to be transferred, and the local clock of the CO side is synchronous with the GPS or the BITS.

In the embodiment of the present invention, the transmission data may relate to two forms, a digital signal and an analog signal, on both the CO side and the CPE side. For example, the CPE side may convert an analog signal transmitted from an analog communication line into a digital signal, or convert a digital signal into an analog signal, and transmit the signal to the CO side. In a DSL system, a symbol is used as a unit when an analog signal is transmitted on the analog communication line. Symbols are continuous and a cyclic prefix may be added between the symbols to eliminate the interference between the symbols.

The judgment unit 720 is configured to judge whether transmission data at a second designated location starts to be received. The judgment unit 720 may monitor the received transmission data in an analog form or in a digital form, and judge whether transmission data at the second designated location starts to be received. In this embodiment, the first designated location and the second designated location may be the same location, and may also be different locations.

The reading unit 730 is configured to read a local clock of the CPE side to obtain time information TS1 when the judgment unit 720 judges that the transmission data at the second designated location already starts to be received.

The synchronization unit 740 is configured to synchronize clock frequencies of the CO side and the CPE side according to the time information TM1 and the time information TS1.

Since an offset may exist between the frequency of the counting frequency signal of the local clock of the CO side and the frequency of the counting frequency signal of the local clock of the CPE side, namely, the CO side and the CPE side are asynchronous, the clock frequency of the CO side and the clock frequency of the CPE side are required to be synchronized according to the time information TM1 and the time information TS1.

Specifically, the synchronization unit 740 may adjust the clock frequency of the local clock of the CPE side according to change information of a difference between the time information TM1 and the time information TS1 till the clock frequency is equal to the clock frequency of the network reference clock of the CO side. In practical implementation, the synchronization unit 740 may use the time information TM1 and the time information TS1 through a phase-locked loop to synchronize the clock frequencies of the CO side and the CPE side.

In the embodiment of the present invention, a network reference clock is not used as a working clock to perform clock synchronization of a DSL system, and therefore the reliability of a DSL link may be independent from the reliability of the network reference clock. In addition, in the embodiment of the present invention, time information TM1 and time information TS1 may be read at any location of transmission data in the DSL system, regardless of whether the transmission data exists in a digital form or an analog form.

Figure 8:
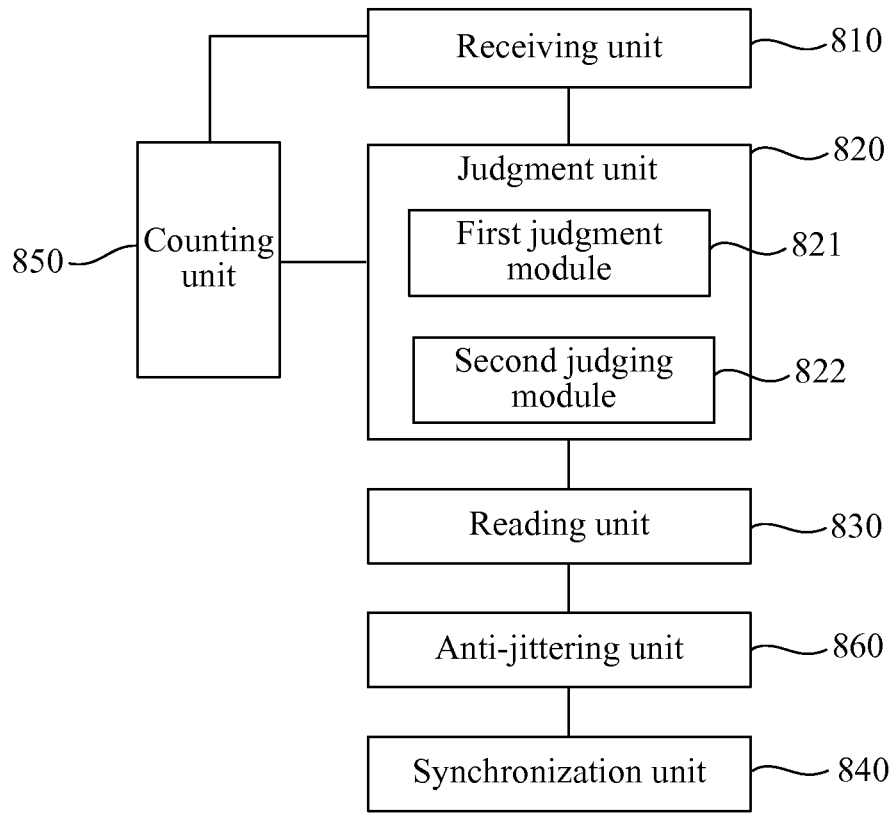
FIG. 8 is a schematic structural diagram of another clock synchronization apparatus according to an embodiment of the present invention.

FIG. 8 is a schematic structural diagram of another clock synchronization apparatus according to an embodiment of the present invention. The apparatus is located on a CPE side. The apparatus includes a receiving unit 810, a judgment unit 820, a reading unit 830, a synchronization unit 840, a counting unit 850, and an anti-jittering unit 860.

The receiving unit 810 is configured to receive, through a message channel, time information TM1 transmitted by a CO side.

The judgment unit 820 includes a first judgment module 821 and a second judgment module 822. The first judgment module 821 processes transmission data in an analog form, whereas the second judgment module 822 processes transmission data in a digital form.

Specifically, the first judgment module 821 is configured to judge, through a symbol synchronization algorithm, whether transmission data at a second designated location starts to be received. If the transmission data at the second designated location already starts to be received, the reading unit 830 is instructed to read a local clock of the CPE side to obtain time information Ts1.

The second judgment module 822 is configured to judge, in combination with the counting unit 850, whether the transmission data at the second designated location in a digital form is received. The counting unit 850 is mainly configured to count the received transmission data in a digital form, in which the counting may use a bit or a byte as a unit. The second judgment module 822 judges, at every counting interval T1, whether the transmission data at the second designated location is being received, and at the same time instructs the reading unit 830 to read the local clock of the CPE side to obtain the time information Ts1.

The anti-jittering unit 860 is configured to perform anti-jittering processing on the time information TM1 and the time information TS1, and then transmit the time information TM1 and the time information TS1 after the anti-jittering processing to the synchronization unit 840. In this embodiment, the anti-jittering processing of the time information TM1 and the anti-jittering processing of the time information TS1 are completed in the anti-jittering unit 860 of the CPE side. However, as an embodiment of the present invention, the anti-jittering unit 860 of the CPE side may also perform the anti-jittering processing on the time information TS1 only, and the anti-jittering processing of the time information TM1 may be completed by the CO side.

In the embodiment of the present invention, a network reference clock is not used as a working clock to perform clock synchronization of a DSL system, and therefore the reliability of a DSL link may be independent from the reliability of the network reference clock. In addition, in the embodiment of the present invention, time information TM1 and time information TS1 may be read at any location of transmission data in the DSL system, regardless of whether the transmission data exists in a digital form or an analog form. In addition, the embodiment of the present invention also eliminates the influence of network jittering during the clock synchronization when the transmission data exists in a digital form.

Figure 9:
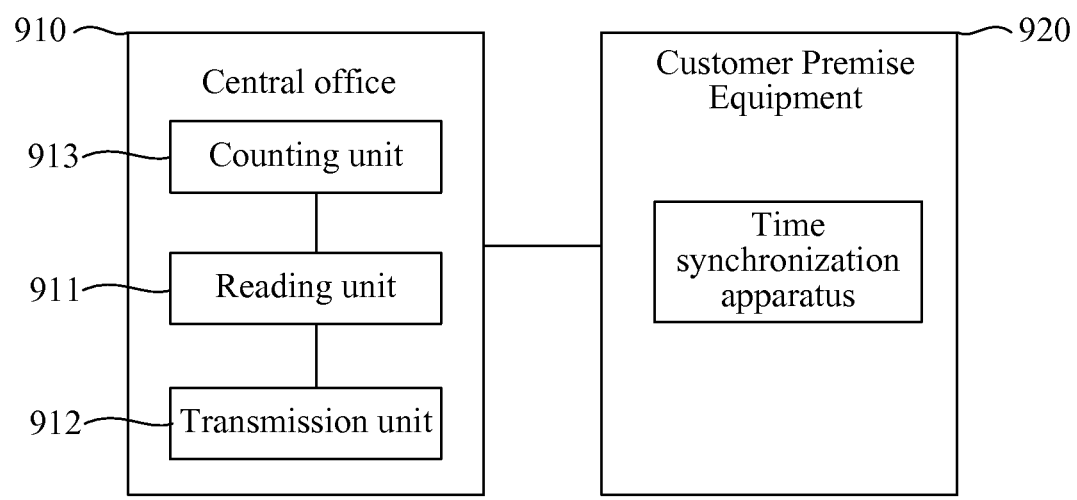
FIG. 9 is a schematic structural diagram of a clock synchronization system according to an embodiment of the present invention.

FIG. 9 is a schematic structural diagram of a clock synchronization system according to an embodiment of the present invention. The system includes a central office 910 and a Customer Premises Equipment 920. The central office 910 and the Customer Premises Equipment 920 are connected to each other through a twisted pair cable. The Customer Premises Equipment 920 may include the time synchronizing apparatus corresponding to FIG. 7 or FIG. 8.

The central office 910 includes a reading unit 911 and a transmission unit 912. The reading unit 911 is configured to read a local clock of the central office side to obtain time information TM1 when transmission data at a first designated location starts to be transferred, in which the local clock of the central office side is synchronous with the GPS or the BITS. The transmission unit 912 is configured to transmit the first time information TM1. As discussed in the aforementioned embodiments, the transmission data on the central office side may also exist in two forms: an analog form and a digital form.

When clock synchronization is completed based on transmission data in an analog form, the reading unit 911 may read, according to a trigger signal transmitted by the central office 910, the local clock of the central office side to obtain the time information TM1 when a symbol on a certain location designated by preset symbol synchronization starts to be transferred.

When clock synchronization is completed based on transmission data in a digital form, the central office further includes a counting unit 913. The counting unit 913 is configured to count transmitted transmission data. The counting may be performed by using a bit or a byte as a unit. The reading unit 911 may read, at every set counting interval T1, the local clock of the central office side according to a counting result of the counting unit 913 to obtain the time information TM1.

In embodiments of the present invention, a network reference clock is not used as a working clock to perform clock synchronization of a DSL system, and therefore the reliability of a DSL link may be independent from the reliability of the network reference clock. In addition, in embodiments of the present invention, time information TM1 and time information TS1 may be read at any location of transmission data in the DSL system, regardless of whether the transmission data exists in a digital form or an analog form.

Those of ordinary skill in the art should understand that all or a part of the steps of the method according to the embodiments may be implemented by a computer program instructing relevant hardware. The program may be stored in a computer readable storage medium. When the program is executed, the steps of the methods according to the embodiments may be included. The storage medium may be a magnetic disk, an optical disk, a Read-Only Memory (Read-Only Memory, ROM) or a Random Access Memory (Random Access Memory, RAM), and the like.

Although the present invention has been described with reference to specific features and embodiments thereof, it should be understood that various changes and substitutions can be made thereto without departing from the spirit and scope of the invention as defined by the appended claims.

What is claimed is:

1. A clock synchronization method, comprising:
receiving time information TM1 from a central office side, wherein the time information TM1 is obtained by the central office side by reading a local clock of the central office side when transmission data at a first designated location starts to be transferred, wherein the local clock of the central office side is synchronous with a Global Positioning System (GPS) clock or a Building Integrated Timing Supply (BITS) clock;
determining whether transmission data at a second designated location starts to be received, and if so, reading a local clock of a Customer Premises Equipment side to obtain time information TS1; and
synchronizing a clock frequency of the Customer Premises Equipment side to the central office side according to the time information TM1 and the time information TS1.

2. The method according to claim 1, wherein the receiving the time information TM1 transmitted by the central office side comprises:
receiving, through a message channel, the time information TM1 transmitted by the central office side.

3. The method according to claim 1, wherein when the transmission data is a digital signal, the judging whether the transmission data at the second designated location starts to be received comprises:
 counting received transmission data to obtain a counting value and judging, according to the counting value and a preset counting interval T1, whether the transmission data at the second designated location starts to be received, wherein the counting interval T1 is an integer larger than 0.

4. The method according to claim 3, before the synchronizing the clock frequencies of the central office side and the Customer Premises Equipment side according to the time information TM1 and the time information TS1, further comprising:
 performing anti-jittering processing on the time information TM1 and on the time information TS1.

5. The method according to claim 1, wherein synchronizing clock frequencies of the central office (CO) side and the Customer Premises Equipment (CPE) side according to the time information TM1 and the time information TS1 comprise:
 adjusting the clock frequency of the local clock of the CPE side according to change information of a difference between the time information TM1 and the time information TS1 till the clock frequency of the local clock of the CPE side is equal to the clock frequency of the CO side.

6. The method according to claim 1, wherein when the transmission data is an analog signal,
 the first designated location of the transmission data on the central office (CO) side is a start location or an end location or any location between the start location and the end location of a transmission symbol.

7. The method according to claim 1, wherein the method is implemented by the central office, and a Transmission Protocol-Specific TC Layer unit or a Physical Media-Specific TC Layer unit in the Customer Premises Equipment.

8. A Customer Premises Equipment apparatus, comprising:
 a receiving unit configured to receive time information TM1 from a central office side, wherein the time information TM1 is obtained by the central office side by reading a local clock of the central office side when transmission data at a first designated location starts to be transferred, and the local clock of the central office side is synchronous with a Global Positioning System (GPS) clock or a Building Integrated Timing Supply (BITS) clock;
 a judgment unit configured to determine whether transmission data at a second designated location starts to be received;
 a reading unit configured to read a local clock of the Customer Premises Equipment side to obtain time information TS1 when the transmission data at the second designated location starts to be received; and
 a synchronization unit configured to synchronize a clock frequency of the Customer Premises Equipment side to the central office side according to the time information TM1 and the time information TS1,
 wherein the receiving unit, judgment unit, reading unit and synchronization unit are comprised of one or more processors.

9. The Customer Premises Equipment according to claim 8, wherein the receiving unit is configured to receive, through a message channel, the time information TM1 transmitted by the central office side.

10. The Customer Premises Equipment according to claim 8, further comprising:
 a counting unit configured to count received transmission data to obtain a counting value;
 wherein the judgment unit further comprises:
 a second judgment module configured to judge, according to the counting value and a preset counting interval T1, whether the transmission data at the second designated location starts to be received, wherein the counting interval T1 is an integer larger than 0.

11. The Customer Premises Equipment according to claim 10, further comprising:
 an anti-jittering unit configured to perform anti-jittering processing on the time information TM1 and/or the time information TS1.

12. A clock synchronization system, comprising:
 a central office, comprising:
 a reading unit configured to read a local clock of the central office side to obtain a time information TM1 when transmission data at a first designated location starts to be transferred, wherein the local clock of the central office side is synchronous with a Global Positioning System (GPS) clock or a Building Integrated Timing Supply (BITS) clock; and
 a transmission unit configured to transmit the time information TM1; and
 a Customer Premises Equipment coupled to the central office, comprising:
 a receiving unit configured to receive the time information TM1 from the central office side;
 a judgment unit configured to determine whether transmission data at a second designated location starts to be received;
 a reading unit configured to read a local clock of the Customer Premises Equipment side to obtain time information TS1 when the transmission data at the second designated location starts to be received; and
 a synchronization unit configured to synchronize a clock frequency of the Customer Premises Equipment side to the central office side according to the time information TM1 and the time information TS1.

13. The system according to claim 12, wherein:
 the central office further comprises a counting unit configured to count transmitted transmission data; and
 the reading unit of the central office is configured to read, at every set counting interval T2, the local clock of the central office side according to a counting result of the counting unit to obtain the time information TM1.

* * * * *

UNITED STATES PATENT AND TRADEMARK OFFICE
CERTIFICATE OF CORRECTION

| | |
|---|---|
| PATENT NO. | : 8,718,213 B2 |
| APPLICATION NO. | : 13/625833 |
| DATED | : May 6, 2014 |
| INVENTOR(S) | : Xu et al. |

Page 1 of 1

It is certified that error appears in the above-identified patent and that said Letters Patent is hereby corrected as shown below:

*On the Title page, Item (71) Applicant's City of Residence "Guangdong (CN)" should read --Shenzhen (CN)--.*

Signed and Sealed this
Ninth Day of September, 2014

Michelle K. Lee
*Deputy Director of the United States Patent and Trademark Office*